(12) United States Patent
Viswanath et al.

(10) Patent No.: US 11,449,838 B2
(45) Date of Patent: Sep. 20, 2022

(54) PREDICTIVE MAINTENANCE

(71) Applicant: AT&T Intellectual Property I, L.P., Atlanta, GA (US)

(72) Inventors: Anoop Viswanath, Plano, TX (US); Abhay Dabholkar, Allen, TX (US); Brad Ford, Wylie, TX (US); Mengling Hettinger, Okemos, MI (US); Kevin Reese, Fayetteville, GA (US); Carl Sorrells, San Antonio, TX (US); Christopher Tsai, Plano, TX (US); Alfonso Jones, Irving, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 185 days.

(21) Appl. No.: 16/876,171

(22) Filed: May 18, 2020

(65) Prior Publication Data

US 2020/0279229 A1 Sep. 3, 2020

Related U.S. Application Data

(63) Continuation of application No. 16/115,644, filed on Aug. 29, 2018, now Pat. No. 10,692,053, which is a continuation of application No. 14/511,354, filed on Oct. 10, 2014, now Pat. No. 10,096,004.

(51) Int. Cl.
*G06Q 10/00* (2012.01)
*G06F 16/245* (2019.01)

(52) U.S. Cl.
CPC ........... *G06Q 10/20* (2013.01); *G06F 16/245* (2019.01)

(58) Field of Classification Search
CPC .............................. G06Q 10/20; G06F 16/245
See application file for complete search history.

(56) References Cited

U.S. PATENT DOCUMENTS

| | | | | |
|---|---|---|---|---|
| 4,766,595 A | * | 8/1988 | Gollomp | G01R 31/3183 714/33 |
| 6,127,947 A | * | 10/2000 | Uchida | B60G 17/0195 340/999 |
| 6,330,499 B1 | * | 12/2001 | Chou | G07C 5/08 701/32.7 |
| 6,356,822 B1 | * | 3/2002 | Diaz | G08G 1/205 340/988 |
| 6,370,454 B1 | * | 4/2002 | Moore | G07C 5/0816 701/32.5 |
| 6,535,141 B1 | * | 3/2003 | Doherty | B60R 16/0237 340/580 |
| 6,535,151 B2 | | 3/2003 | Doherty | |

(Continued)

OTHER PUBLICATIONS

Nowaczyk, Slawomir, et al. "Towards a Machine Learning Algorithm for Predicting Truck Compressor Failures Using Logged Vehicle Data." *Twelfth Scandinavian Conference on Artificial Intelligence.* 2013.

(Continued)

*Primary Examiner* — Mussa A Shaawat
(74) *Attorney, Agent, or Firm* — Amin, Turocy & Watson, LLP

(57) ABSTRACT

Vehicular maintenance is predicted using real time telematics data and historical maintenance data. Different statistical models are used, and an intersecting set of results is generated. Environmental weather may also be used to further refine predictions.

20 Claims, 18 Drawing Sheets

(56) References Cited

U.S. PATENT DOCUMENTS

| | | | |
|---|---|---|---|
| 6,609,051 B2 * | 8/2003 | Fiechter | G05B 23/0243 |
| | | | 714/E11.158 |
| 7,356,393 B1 * | 4/2008 | Schlatre | G06Q 10/06 |
| | | | 701/36 |
| 7,457,785 B1 | 11/2008 | Greitzerl | |
| 7,663,502 B2 * | 2/2010 | Breed | G08B 29/181 |
| | | | 340/7.29 |
| 7,839,301 B2 * | 11/2010 | Doherty | E01H 10/007 |
| | | | 239/662 |
| 7,920,944 B2 | 4/2011 | Gould et al. | |
| 7,945,359 B2 | 5/2011 | Watkins et al. | |
| 8,131,456 B2 | 3/2012 | Mahalingaiah et al. | |
| 8,165,826 B2 | 4/2012 | Schimert et al. | |
| 8,374,745 B2 | 2/2013 | Zhang et al. | |
| 8,478,514 B2 | 7/2013 | Kargupta | |
| 9,520,006 B1 * | 12/2016 | Sankovsky | G06Q 50/30 |
| 10,936,987 B2 * | 3/2021 | MacAdam | G06Q 10/06398 |
| 2006/0097854 A1 | 5/2006 | Basu | |
| 2008/0059272 A1 | 3/2008 | Jeanneret et al. | |
| 2009/0254240 A1 * | 10/2009 | Olsen, III | G07C 5/008 |
| | | | 701/29.5 |
| 2010/0017049 A1 | 1/2010 | Swearingen | |
| 2010/0115505 A1 | 5/2010 | Touati | |
| 2010/0121588 A1 | 5/2010 | Elder | |
| 2011/0029243 A1 * | 2/2011 | Gallagher | G01W 1/00 |
| | | | 702/3 |
| 2011/0040719 A1 | 2/2011 | Aguilar | |
| 2011/0046842 A1 | 2/2011 | Smith | |
| 2011/0128118 A1 | 6/2011 | Gilleland | |
| 2013/0013231 A1 | 1/2013 | Banerjee | |
| 2013/0325787 A1 | 12/2013 | Gerken | |
| 2014/0088866 A1 | 3/2014 | Knapp et al. | |
| 2014/0129163 A1 | 5/2014 | Betzner | |
| 2014/0188329 A1 | 7/2014 | Chen et al. | |
| 2014/0195098 A1 | 7/2014 | Lorenz et al. | |
| 2014/0236655 A1 | 8/2014 | Wamer | |
| 2015/0005982 A1 * | 1/2015 | Muthukumar | B60T 8/1725 |
| | | | 701/1 |
| 2015/0215844 A1 | 7/2015 | Davis | |
| 2015/0330867 A1 | 11/2015 | Potts | |
| 2016/0035150 A1 | 2/2016 | Barfield, Jr. | |
| 2016/0042644 A1 | 2/2016 | Velusamy | |
| 2016/0098869 A1 | 4/2016 | Rood | |
| 2017/0072850 A1 | 3/2017 | Curtis | |

OTHER PUBLICATIONS

Prytz, Rune, et al. "Analysis of truck compressor failures based on logged vehicle data." (2013).

Non-Final Office Action received for U.S. Appl. No. 16/115,644 dated Jun. 26, 2019, 14 pages.

Final Office Action received for U.S. Appl. No. 16/115,644 dated Nov. 8, 2019, 10 pages.

Non-Final Office Action received for U.S. Appl. No. 14/511,354 dated May 3, 2017, 13 pages.

Final Office Action received for U.S. Appl. No. 14/511,354 dated Sep. 11, 2017, 12 pages.

Non-Final Office Action received for U.S. Appl. No. 14/511,354 dated Jan. 4, 2018, 9 pages.

* cited by examiner

FIG. 7

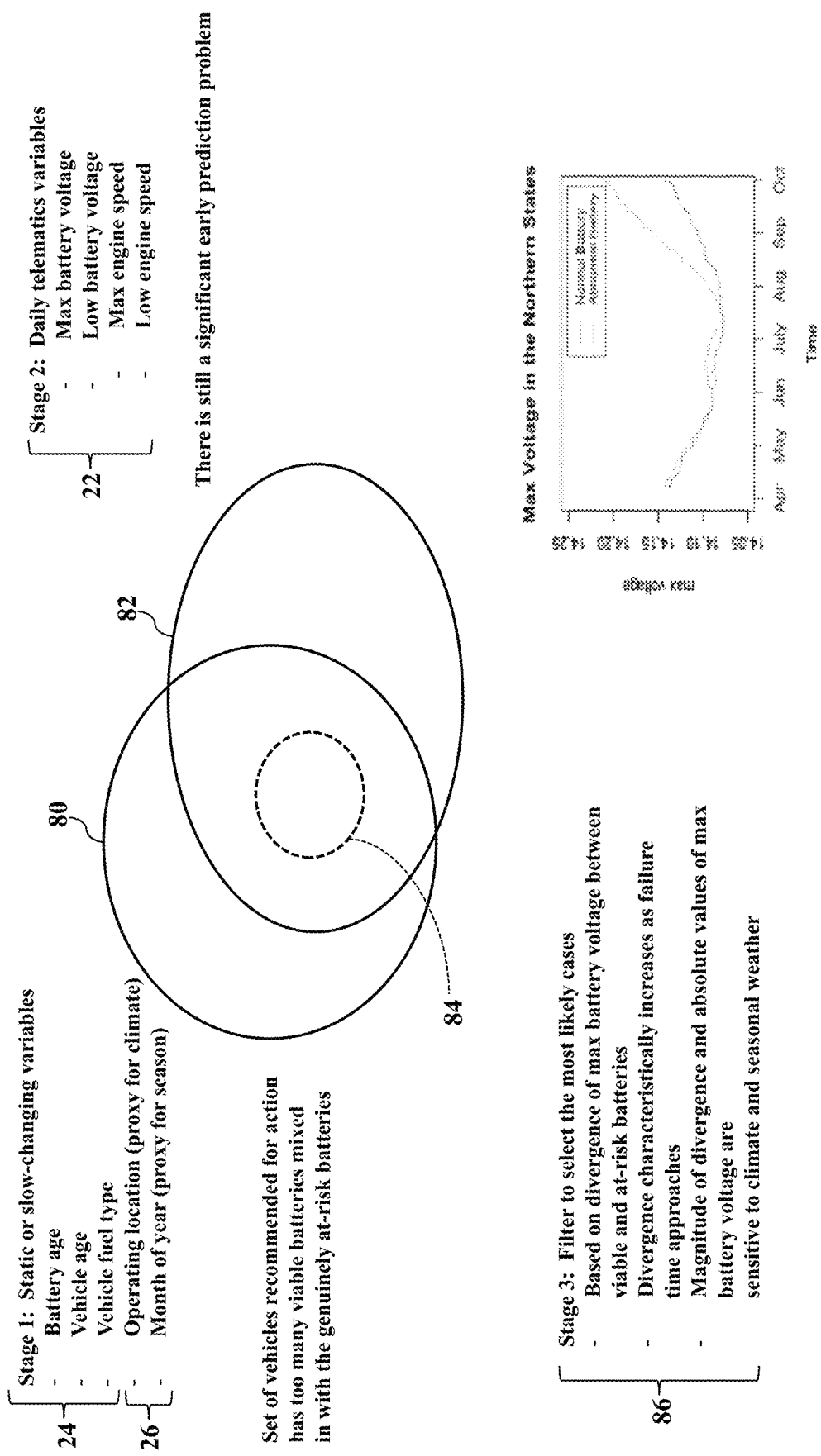

Stage 1: Static or slow-changing variables
- Battery age
- Vehicle age
- Vehicle fuel type
- Operating location (proxy for climate)
- Month of year (proxy for season)

Stage 2: Daily telematics variables
- Max battery voltage
- Low battery voltage
- Max engine speed
- Low engine speed There is still a significant early prediction problem Set of vehicles recommended for action has too many viable batteries mixed in with the genuinely at-risk batteries Stage 3: Filter to select the most likely cases
- Based on divergence of max battery voltage between viable and at-risk batteries
- Divergence characteristically increases as failure time approaches
- Magnitude of divergence and absolute values of max battery voltage are sensitive to climate and seasonal weather

FIG. 11

Fleet Daily Predictions

| Vehicle | Task Name | Garage ID | Fuel Type | Act Before |
|---|---|---|---|---|
| 2002853 | Electrical System - Battery | TX003A | UNL | 27-Jun-14 |
| 3005104 | Electrical System - Battery | TX0022 | UNL | 27-Jun-14 |
| 2093041 | Electrical System - Battery | TX0022 | UNL | 27-Jun-14 |
| 2100106-226 | Electrical System - Battery | TX050 | UNL | 27-Jun-14 |
| 2016266-396 | Electrical System - Battery | MO001A | UNL | 27-Jun-14 |
| 1098479 | Electrical System - Battery | TX0022 | UNL | 26-Jun-14 |
| 3000086-297 | Electrical System - Battery | GA111 | UNL | 26-Jun-14 |
| 3004340-293 | Electrical System - Battery | GA111 | UNL | 26-Jun-14 |
| 2033868 | Electrical System - Battery | TX050 | UNL | 26-Jun-14 |
| 2500065-298 | Electrical System - Battery | GA111 | UNL | 26-Jun-14 |
| 2017865-797 | Electrical System - Battery | TX050 | UNL | 26-Jun-14 |
| 8032064 | Electrical System - Battery | TX050 | UNL | 26-Jun-14 |

FIG. 12

Fleet Repair History

Find: [        ]

| Vehicle | Task Name | Job Date | Charges | Hours | |
|---|---|---|---|---|---|
| 3001088 | Travel Shuttle / Passenger | Tue Jun 10 11:06:33 CDT 2014 | 0.00 | 1.00 | ⊕ |
| 3001088 | Travel Shuttle / Passenger | Tue Jun 10 11:06:33 CDT 2014 | 0.00 | 1.00 | ⊕ |
| 3001088 | Travel Shuttle / Passenger | Tue Jun 10 11:06:33 CDT 2014 | 0.00 | 1.00 | ⊕ |
| 3001088 | Travel Shuttle / Passenger | Tue Jun 10 11:06:33 CDT 2014 | 0.00 | 1.00 | ⊕ |
| 2024907 | Safety Check OTH | Tue Jun 10 11:04:58 CDT 2014 | 0.00 | 0.50 | ⊕ |
| 2024907 | Alternator R&R | Tue Jun 10 11:04:58 CDT 2014 | 0.00 | 0.50 | ⊕ |
| 2024907 | Electrical System DIA | Tue Jun 10 11:04:58 CDT 2014 | 0.00 | 0.50 | ⊕ |

PREDICTIVE MAINTENANCE

CROSS-REFERENCE TO RELATED APPLICATIONS

This patent application is a continuation of U.S. application Ser. No. 16/115,644 filed Aug. 29, 2018 and since issued as U.S. Pat. No. 10,692,053, which is a continuation of U.S. application Ser. No. 14/511,354 filed Oct. 10, 2014 and since issued as U.S. Pat. No. 10,096,004, with both patent applications incorporated herein by reference in their entireties.

BACKGROUND

Predictive maintenance saves time and money. As equipment is used, maintenance is required. Being able to predict when that maintenance may be required allows operators to take preemptive action, which in turn reduces the rate of unanticipated breakdowns and their associated cost, delay, and equipment downtime.

BRIEF DESCRIPTION OF THE SEVERAL VIEWS OF THE DRAWINGS

The features, aspects, and advantages of the exemplary embodiments are understood when the following Detailed Description is read with reference to the accompanying drawings, wherein:

FIG. 7 is another schematic illustrating vehicular maintenance, according to exemplary embodiments;

FIGS. 11-12 are schematic illustrating reporting features, according to exemplary embodiments;

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
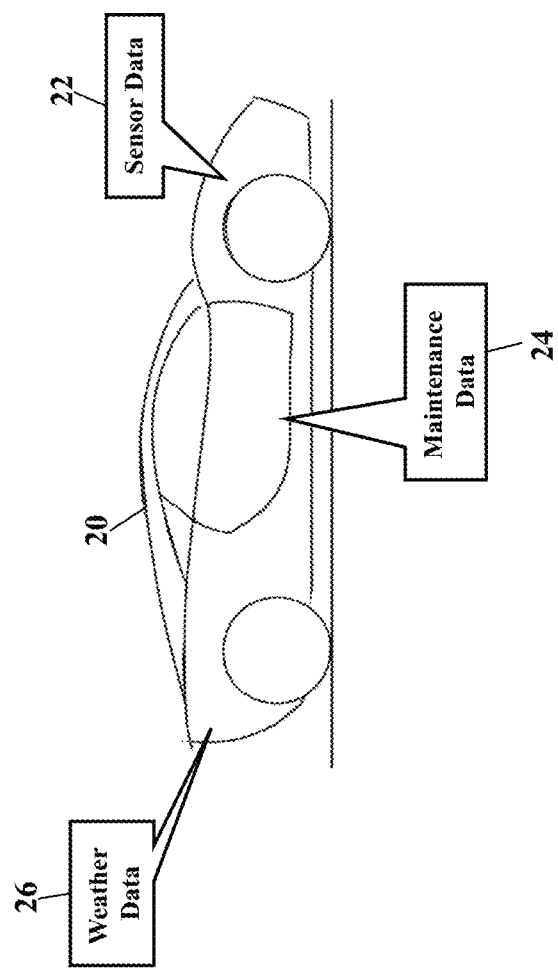
FIGS. 1-2 are simplified schematics illustrating an environment in which exemplary embodiments may be implemented.
Figure 2:
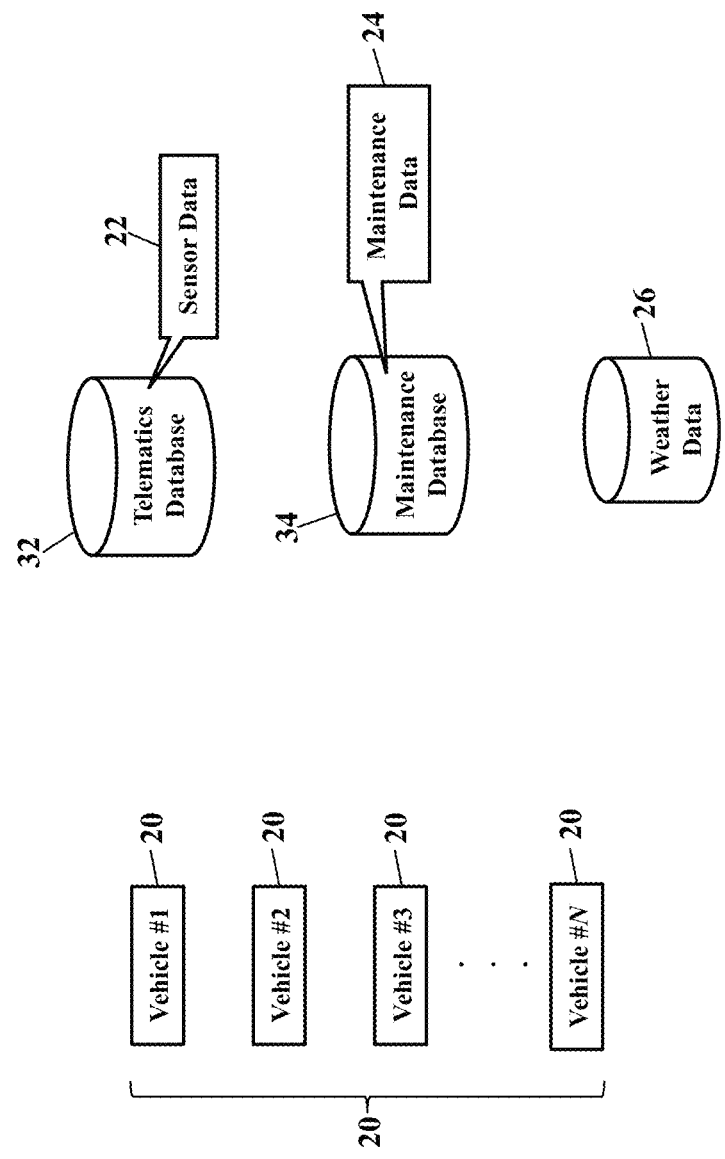

FIGS. 1-2 are simplified schematics illustrating an environment in which exemplary embodiments may be implemented. FIG. 1 illustrates a vehicle 20 used for transportation of people and cargo. As the vehicle 20 operates, wear and tear takes a toll on the vehicle's components. As the reader likely understands, the brakes, tires, engine, and other components wear and/or degrade as usage and miles accumulate. A conventional maintenance program would require inspection and replacement of various components at particular mileages.

Exemplary embodiments take a smarter approach. Exemplary embodiments predict when maintenance should be performed, based on actual data about the vehicle 20. For example, exemplary embodiments wirelessly obtain sensor data 22 from the vehicle's on-board sensors. As the reader again likely understands, the vehicle 20 has many controllers and sensors that monitor the performance of the engine, transmission, brakes, suspension, and other systems. Any of this sensor data 22 is wirelessly uploaded from the vehicle 20 to a central server, thus providing generally real-time, on-road reporting of outputs, diagnostic codes, and other information. Exemplary embodiments analyze the sensor data 22 to predict when the maintenance should be performed. Exemplary embodiments also obtain historical maintenance data 24 of the vehicle 20. As the vehicle 20 accumulates miles, service records are stored that log and detail the historical maintenance performed on the vehicle 20. Moreover, exemplary embodiments also obtain weather data 26. As the reader again understands, the environmental weather conditions (such as temperature, humidity, and precipitation) may affect wear and tear of the vehicle's components. Northern salty roads, for example, promote wear and corrosion of braking components, thus requiring more frequent repair than southern climates. Exemplary embodiments collect the sensor data 22, the historical maintenance data 24, and the weather data 26 to predict what maintenance should be performed, and when that maintenance should be performed. The maintenance may thus be performed just in time, thus anticipating a service need and recommending preemptive action.

FIG. 2 illustrates service populations. Here exemplary embodiments may also consult computer databases containing data for one or more populations 30 of vehicles. As many different vehicles share common or similar components, information from fleets or populations of different vehicles may further refine the predictive maintenance. For example, a telematics database 32 may store the sensor data 22 from many vehicles. As vehicles across a fleet or manufacturer gain usage, each vehicle may transmit its sensor data 22 for logging in the telematics database 32. The telematics database 32 may thus store telematics on-board diagnostic data (e.g., OBD codes) for many different vehicles. Likewise, a maintenance database 34 may store the maintenance data 24 for many different vehicles. As the population 30 of vehicles accumulates service miles, the maintenance database 34 may log maintenance records, problem reports, customer issues, and any other historical data regarding each vehicle 20. The weather data 26 may further augment predictions of maintenance due to environmental conditions. All this data may thus be used to further predict when maintenance should be performed on any individual vehicle 20 or the entire population 30 of vehicles. That is, patterns in populations may be used to anticipate a service need of any vehicle 20. Exemplary embodiments thus empower fleet operators, vehicle manufactures, and even government regulators to predict vehicular maintenance, thus enhancing both profits and safety.

Figure 3:
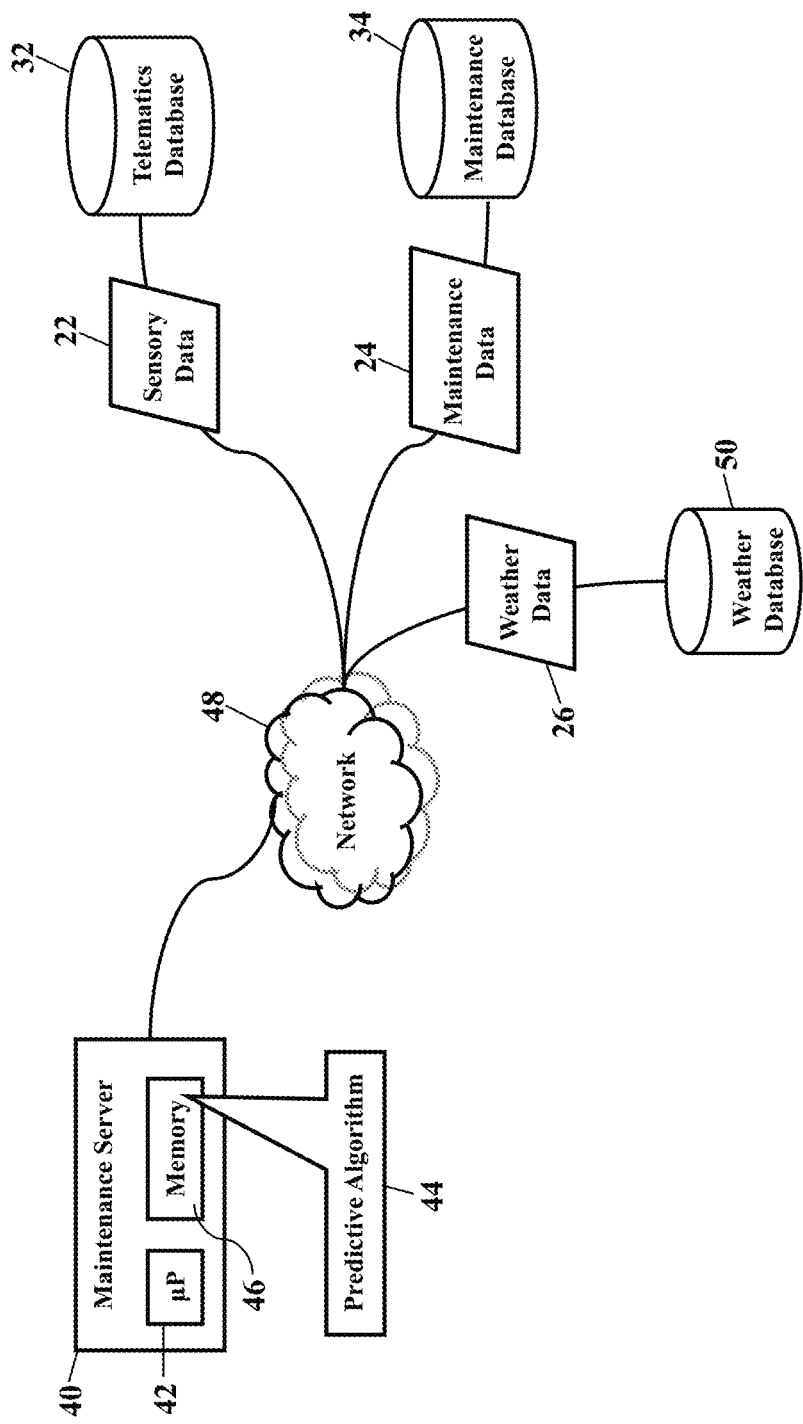
FIG. 3 is a more detailed block diagram illustrating the operating environment, according to exemplary embodiments.

FIG. 3 is a more detailed block diagram illustrating the operating environment, according to exemplary embodiments. FIG. 3 illustrates a maintenance server 40 that predicts maintenance to be performed on cars, trucks, planes, trains, or any other vehicle. Indeed, the maintenance server 40 may predict maintenance for any machine or process, as later paragraphs will explain. The maintenance server 40 has a processor 42 (e.g., "μP"), application specific integrated circuit (ASIC), or other component that executes a predictive algorithm 44 stored in a memory 46. The predictive algorithm 44 instructs the processor 42 to perform operations, such as retrieving the sensor data 22 from the telematics database 32 using a communications network 48. The predictive algorithm 44 also instructs the processor 42 to retrieve the maintenance data 24 from the maintenance database 34 and to retrieve the weather data 26 from a weather database 50. The predictive algorithm 44 causes the processor 42 to analyze the sensor data 22, the maintenance data 24, and the weather data 26 and to predict component service and/or failures. That is, whatever data is provided, the predictive algorithm 44 uses the data to predict failures, based on the data.

Figure 4:
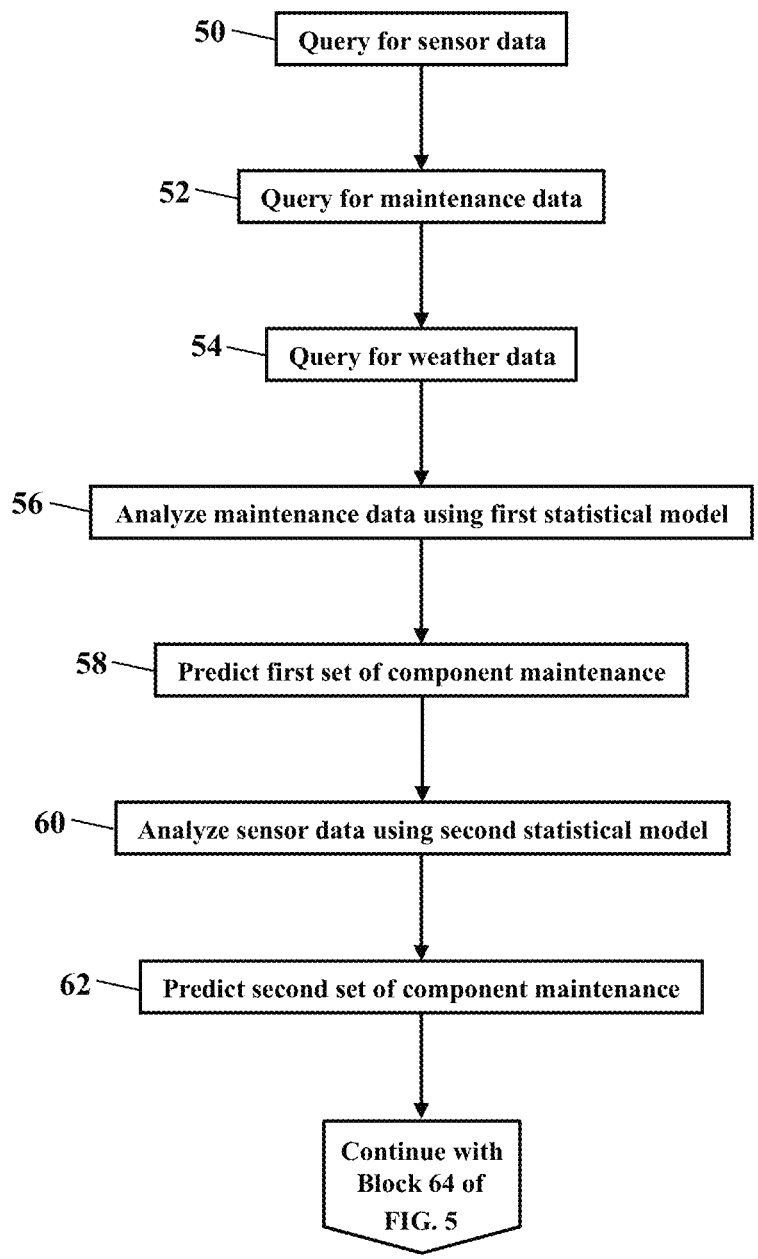
FIGS. 4-5 are flowcharts illustrating a general process of predictive maintenance, according to exemplary embodiments.
Figure 5:
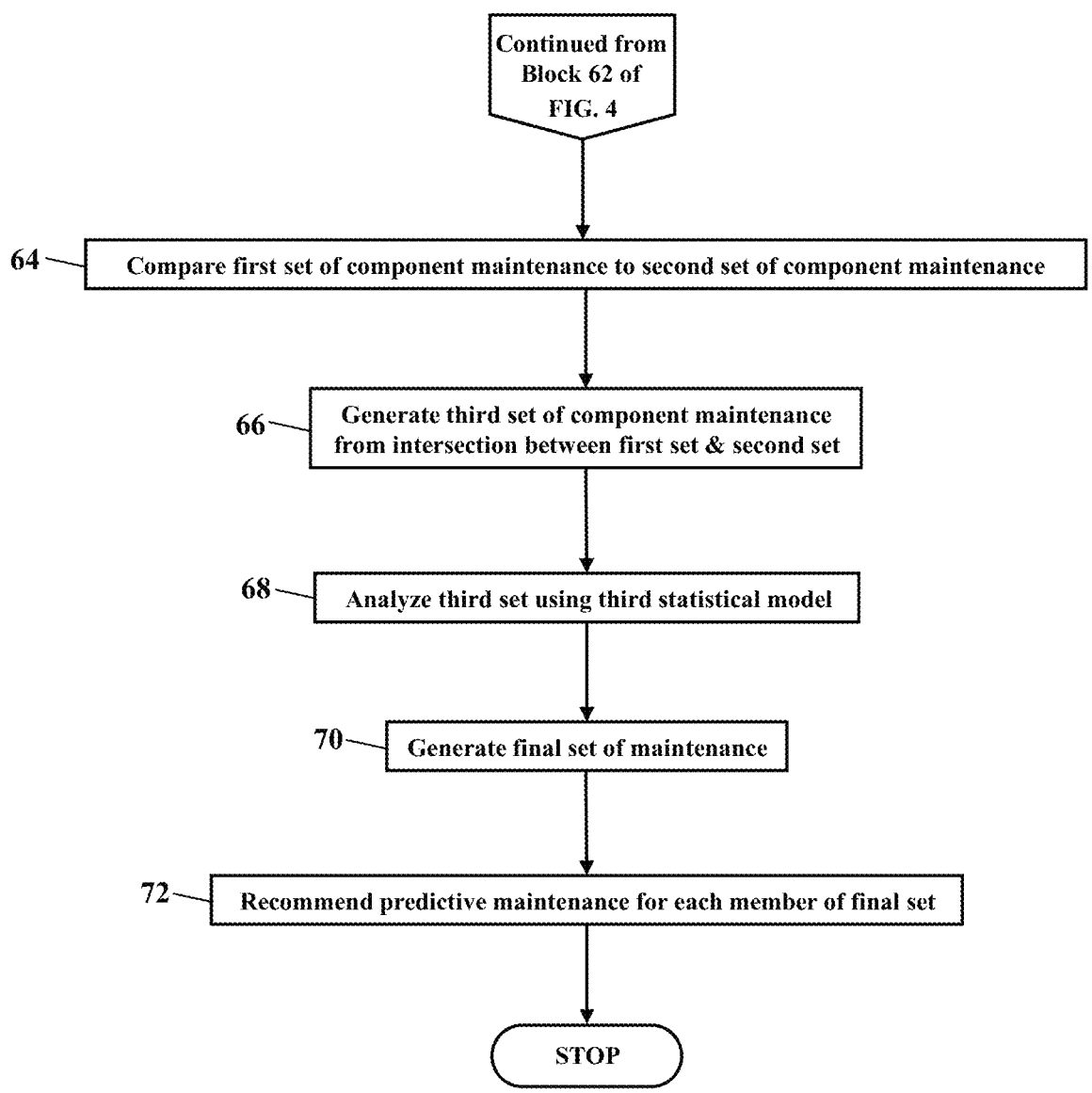

FIGS. 4-5 are flowcharts illustrating the general process of the predictive algorithm 44, according to exemplary embodiments. The telematics database 32 is queried for the sensor data 22 (Block 50). The maintenance database 34 is queried for the maintenance data 24 (Block 52). The weather database 50 is queried for the weather data 26 (Block 54). The maintenance data 24 is analyzed using a first statistical model (Block 56) to predict a first set of component maintenance (Block 58). That is, in simple words, exemplary embodiments make a first prediction of the components that may require maintenance, based on the maintenance data 24 in the maintenance database 34. The sensor data 22 is then analyzed using a second statistical model (Block 60) to predict a second set of component maintenance (Block 62). Again, in simple words, exemplary embodiments make a second prediction of the components that may require maintenance, based on the sensor data 22 in the telematics database 32. Exemplary embodiments have thus utilized two different datasets (e.g., the maintenance data 24 in the maintenance database 34 and the sensor data 22 in the telematics database 32) to predict two different sets of components that may require maintenance.

The flowchart continues with FIG. 5. After the two different datasets are generated, the first set of component maintenance is compared to the second set of component maintenance (Block 64). Matching results indicate both datasets predict the same maintenance in the same components. That is, a third set of component maintenance is generated from an intersection (Block 66) between the first set of component maintenance (predicted from the maintenance data 24 in the maintenance database 34) and the second set of component maintenance (predicted from the sensor data 22 in the telematics database 32). Once the intersecting third set of component maintenance is generated, exemplary embodiments analyze the intersecting third set of component maintenance using a third statistical model (Block 68) to generate a final set of maintenance (Block 70). Predictive maintenance may thus be recommended for each component member of the final set of maintenance (Block 72). Exemplary embodiments, then, may use any combination of three (3) statistical models to predict what components need maintenance. Indeed, if two (2) of the models make the same component prediction, the third statistical model may further refine the final prediction.

Figure 6:
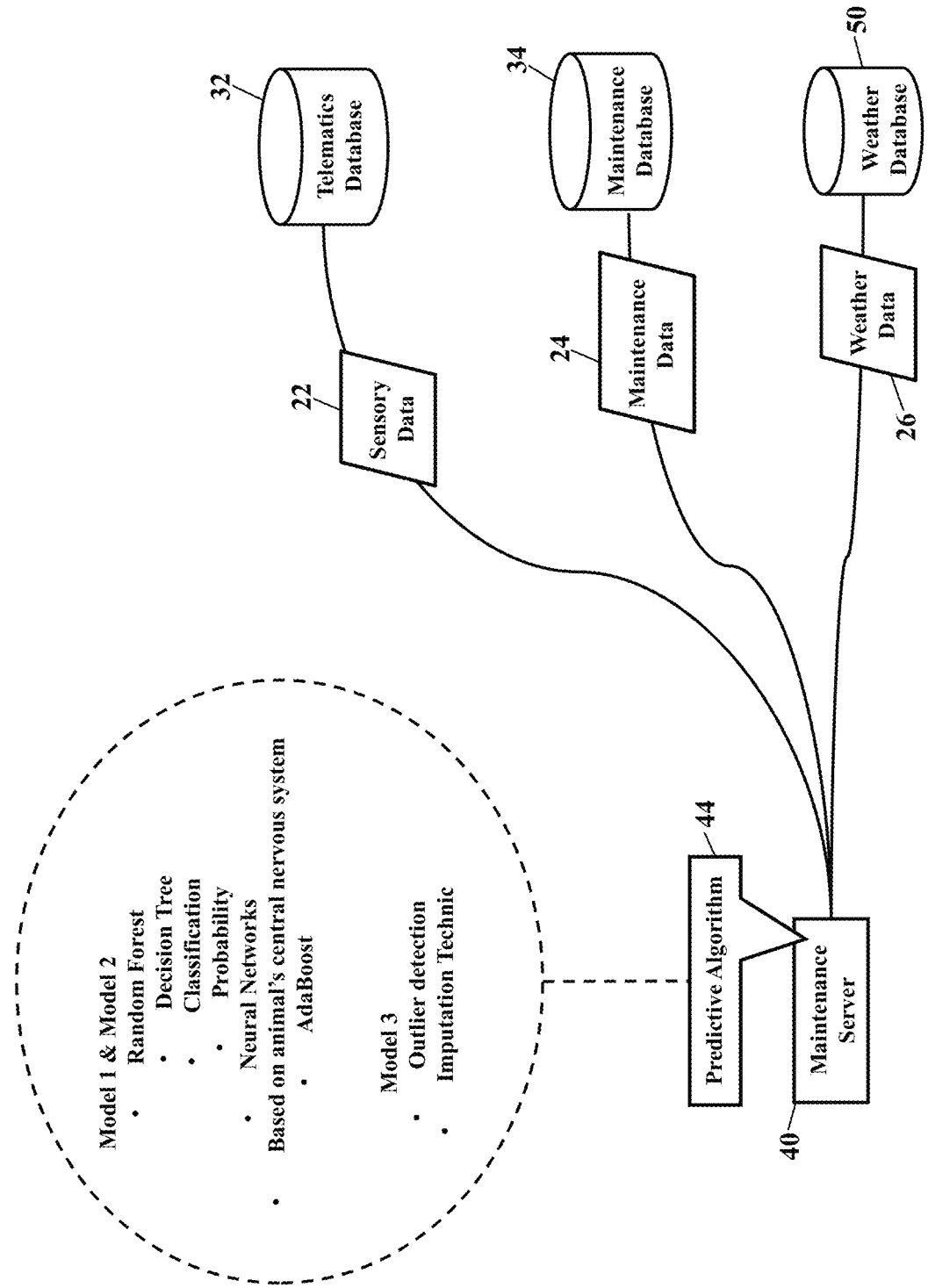
FIG. 6 is a schematic illustrating the statistical models, according to exemplary embodiments.

FIG. 6 is a schematic illustrating the statistical models, according to exemplary embodiments. FIG. 6 illustrates just some of the statistical algorithms that exemplary embodiments may use. While exemplary embodiments may use any statistical model, this disclosure will be primarily explained using the RANDOM FOREST® algorithm, based on its accuracy and simplicity. As the RANDOM FOREST® algorithm is well known, no detailed explanation of the algorithm is needed. Exemplary embodiments, then, may use the RANDOM FOREST® algorithm to analyze the maintenance data 24 in the maintenance database 34. The RANDOM FOREST® algorithm may also be used to analyze the sensor data 22 in the telematics database 32. Once the intersecting results are determined, exemplary embodiments may then use any statistical model to detect or observe anomalies in the intersecting/matching results. For example, exemplary embodiments may use any outlier detection model to make the final prediction of maintenance.

FIG. 7 is another schematic illustrating vehicular maintenance, according to exemplary embodiments. Here the exemplary maintenance data 24 may be an age of a battery, the age of the corresponding vehicle, and/or a type of fuel used by the vehicle. The weather data 26 is represented by the governmental state of usage or registration (a proxy for climate) and a calendar date and time (a proxy for season). This static maintenance data 24 and the weather data 26 is analyzed using the RANDOM FOREST® algorithm to generate the first set 80 of component maintenance. The exemplary sensor data 22 (real time or near real time battery voltage and engine RPM speed) is also analyzed using the RANDOM FOREST® algorithm to generate a second set 82 of component maintenance. The third set 84 of component maintenance is generated from the intersecting matches between first set 80 of component maintenance and the second set 82 of component maintenance. The outlier detection model 86 is then used to make the final prediction of maintenance. Using these exemplary datasets, then, exemplary embodiments may predict a failure of the battery in the corresponding vehicle.

Figure 8:
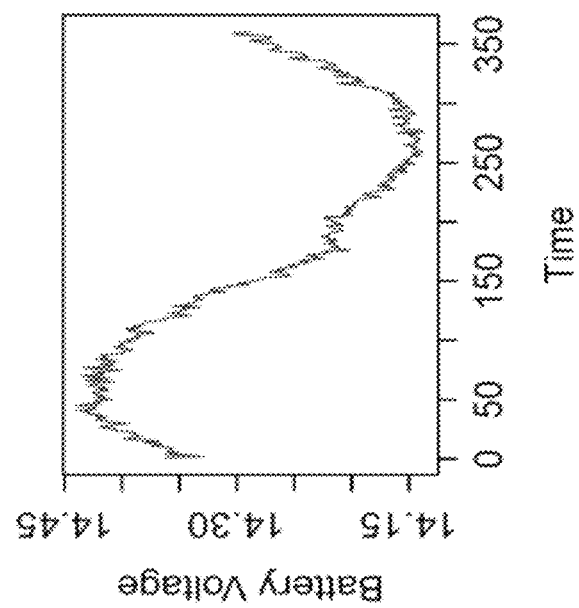
FIG. 8 is a graph illustrating weather considerations, according to exemplary embodiments.

FIG. 8 is a graph illustrating weather considerations, according to exemplary embodiments. As this disclosure previously mentioned, environmental weather conditions may greatly impact the service life of a vehicle component. Because the weather data (illustrated as reference numeral 26 in FIGS. 1-3 & 6) may also be an input to the predictive algorithm 44, the weather data 26 may further refine any prediction of maintenance. FIG. 8, for example, illustrates the impact of the weather data 26 on the predicted life of the battery in the corresponding vehicle. Volatility in humidity data (e.g., average, minimum and/or maximum), temperature data (e.g., average, minimum and/or maximum), and/or precipitation data may thus affect the life of battery. FIG. 8 thus illustrates seasonal variance in battery voltage with time. Service lifetime of the battery is thus impacted by service ambient conditions.

Figure 9:
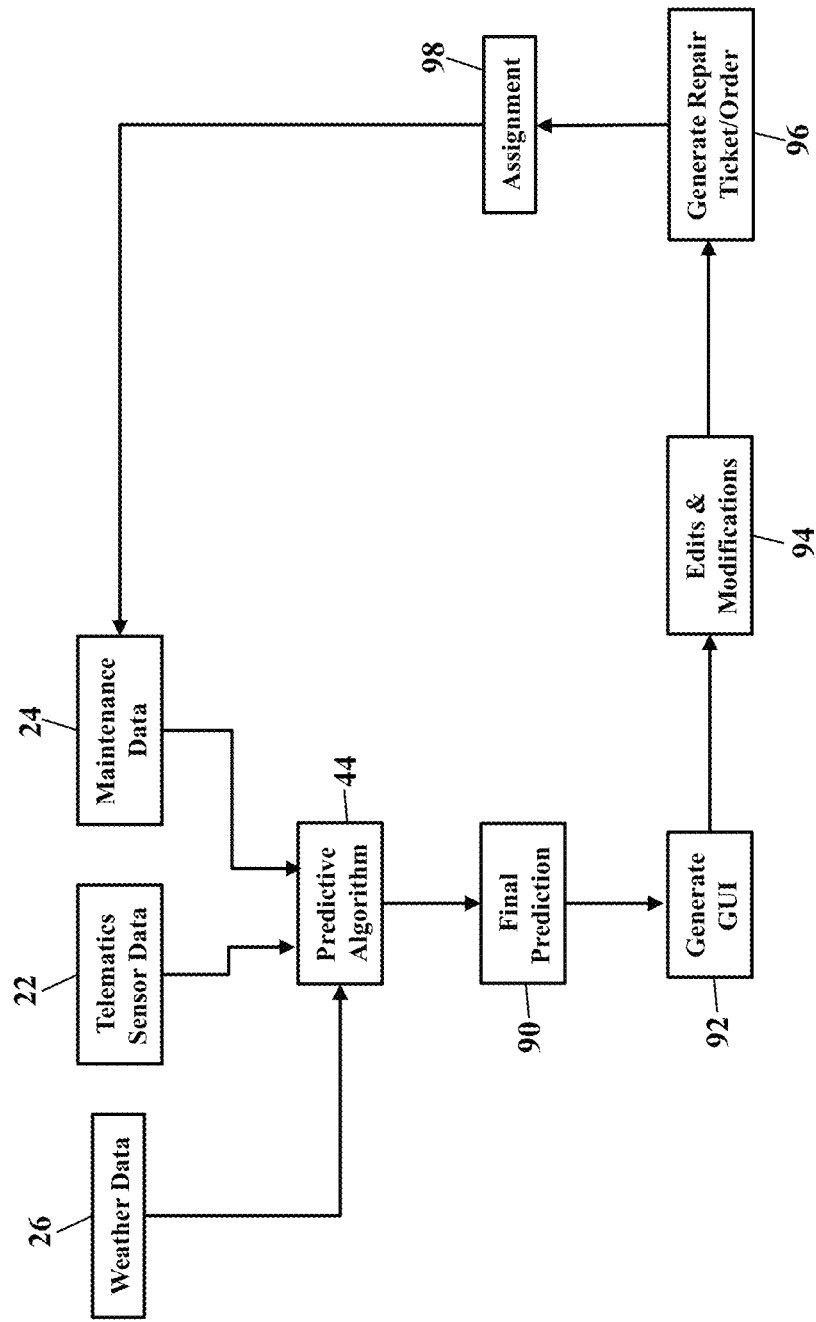
FIG. 9 is a flow diagram illustrating predictive maintenance, according to exemplary embodiments

FIG. 9 is a flow diagram illustrating predictive maintenance, according to exemplary embodiments. The telematics sensor data 22 is fed as a daily input to the predictive algorithm 44. The maintenance data 24 and the weather data 26 may also be provided as a daily input. The predictive algorithm 44 runs the statistical models (as above explained) to generate the statistical outliers as the final prediction of maintenance (Block 90). Once the statistical outliers are generated, exemplary embodiments process the data in the final prediction of maintenance and generate a graphical user interface (or "GUI") (Block 92). The graphical user interface is thus generated for display on a display device (not shown for simplicity). For example, the graphical user interface may be processed and/or generated as a web page for download to a client device using any web browser application. The graphical user interface may thus be provided from a server to a client device, thus allowing the final prediction of maintenance to be processed for visual presentation. A user of the client device may thus visually inspect the predictive maintenance recommended by the predictive algorithm 44 and make any desired modifications or edits (Block 94). Because maintenance is predicted, a repair ticket or work order is generated (Block 96) and assigned for repair (Block 98). The corresponding maintenance is then logged as feedback to the maintenance data 24.

The final prediction 90 is a refinement. The core concept of the third stage, final prediction 90 is to use outlier detection techniques to refine the prediction results from the first two classification stages. Results from first two models could result in early prediction issue. Early prediction issue causes a battery to be predicted as going to fail, too early. Early prediction problem causes wastage of battery life. The third stage model uses outlier detection technic to overcome early prediction problem. Exemplary embodiments used the maintenance data 24, battery voltage obtained from OBDII sensor data 22, and the weather data 26 to observe that batteries which are in good condition tend to show a different voltage pattern over time compared to the batteries which are about to die. These two distinctive patterns were used to produce the final prediction 90 of bad batteries, which are about to fail in the coming weeks.

Figure 10:
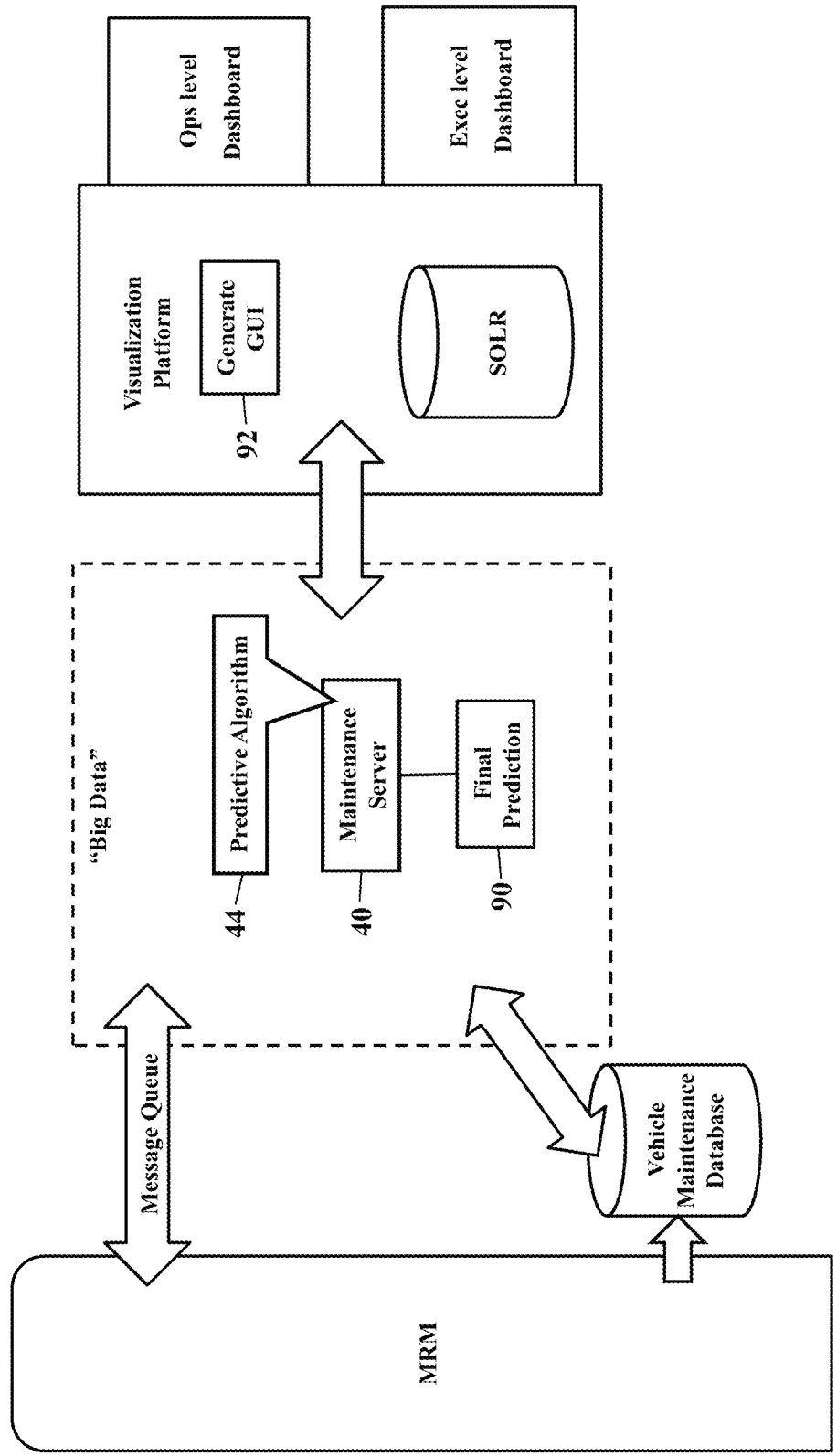
FIG. 10 is a schematic illustrating ingestion of input data, according to exemplary embodiments

FIG. 10 is a schematic illustrating ingestion of input data, according to exemplary embodiments. Here the sensor data 22 may be provided by a mobile resource management (or "MRM") data feed, which is vehicular information obtained from any known vendor. The sensor data 22 is consumed in a "Big Data" environment by the maintenance server 50 using a message queue, which is known. The mobile resource management data feed also sends a summarized view of the sensor data 22 to a fleet operation's database (e.g., "Vehicle Maintenance Database"). The fleet operation's database also provides the maintenance data 24 of the fleet vehicles. The predictive algorithm 44 processes these inputs to generate the final prediction of maintenance (Block 90). Any visualization software may then be used to generate the graphical user interface (Block 92) (such as the known SOLR® enterprise platform). Different summary views may then be provided, depending on the audience (e.g., operations or executives).

FIGS. 11-12 are schematic illustrating reporting features, according to exemplary embodiments. FIG. 11, for example, illustrates a daily maintenance report that may be generated, based on the predictions. As exemplary embodiments may receive daily data feeds, each day may result in new or updated predictions as daily service miles are accumulated. Indeed, some fleet vehicles may accumulate hundreds of miles per day, so predictive maintenance is a daily requirement. Exemplary embodiments may thus generate a daily report identifying the vehicles to be maintained and the repair to be performed. Moreover, the report may also include a target date of the predicted repair for scheduling purposes. FIG. 11, for example, illustrates a daily report notifying of potential battery failures in certain fleet vehicles, based on the sensor data 22, the maintenance data 24, and the weather data 26 (as above explained). Fleet operations are thus given two (2) weeks to complete the repair before imminent failure is predicted. The daily report illustrated in FIG. 11 is generated by the known SOLR® software tool. FIG. 12 illustrates a history report that details maintenance repairs completed on a daily basis. The history report, of course, may have different calendar frames, such as a weekly or monthly review of repair efforts.

Figure 13:
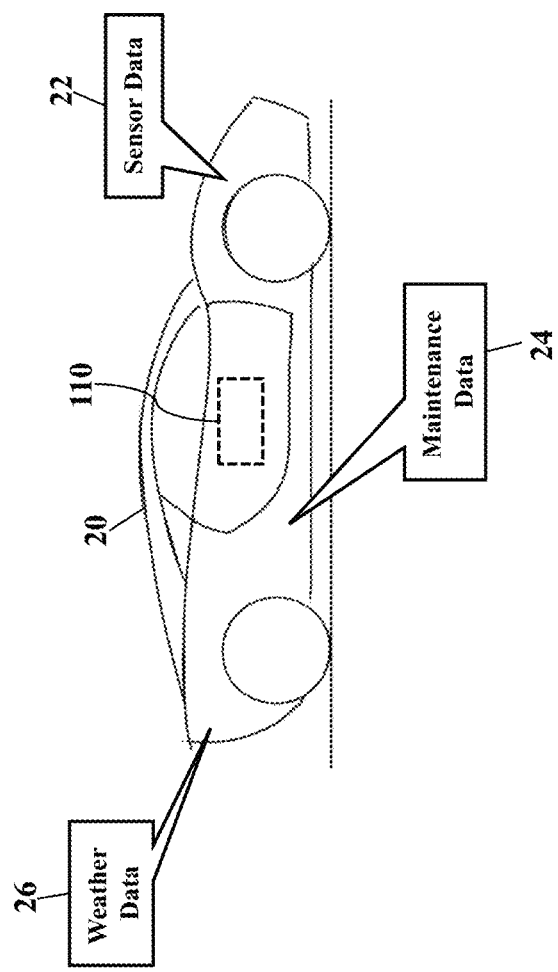
FIGS. 13-15 are schematics illustrating other exemplary operating environments.
Figure 14:
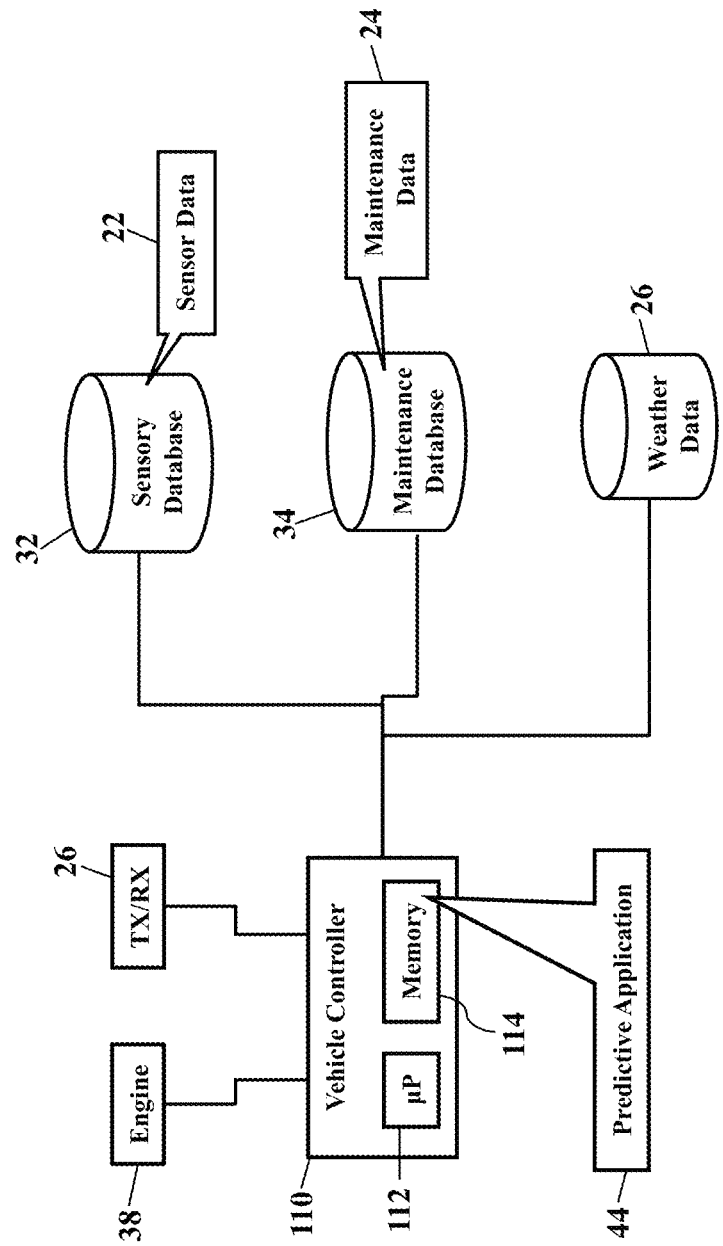

FIGS. 13-14 are schematics illustrating other exemplary operating environments. Here the vehicle 20 may predict its own maintenance, based on input data. As the sensors in the vehicle 20 already collect its sensor data 22, the vehicle itself may predict when repairs are needed. The vehicle 20, for example, may have a controller 110 that collects the sensor data 22. The controller 110 may also query for the maintenance data 24, whether locally or remotely retrieved. Moreover, as modern vehicles have wireless communications capabilities, the controller 110 may retrieve the weather data 26. As FIG. 14 illustrates, the controller 110 may thus analyze all this data and predict when its components require repair. The controller 110 may have a processor 112 (e.g., "µP"), application specific integrated circuit (ASIC), or other component that executes any or all of the predictive algorithm 44 stored in a memory 114. The predictive algorithm 44 instructs the processor 42 to perform operations, such as retrieving the sensor data 22, the maintenance data 24, and/or the weather data 26. The predictive algorithm 44 causes the controller 110 to predict component service and/or failures, as this disclosure explains.

Figure 15:
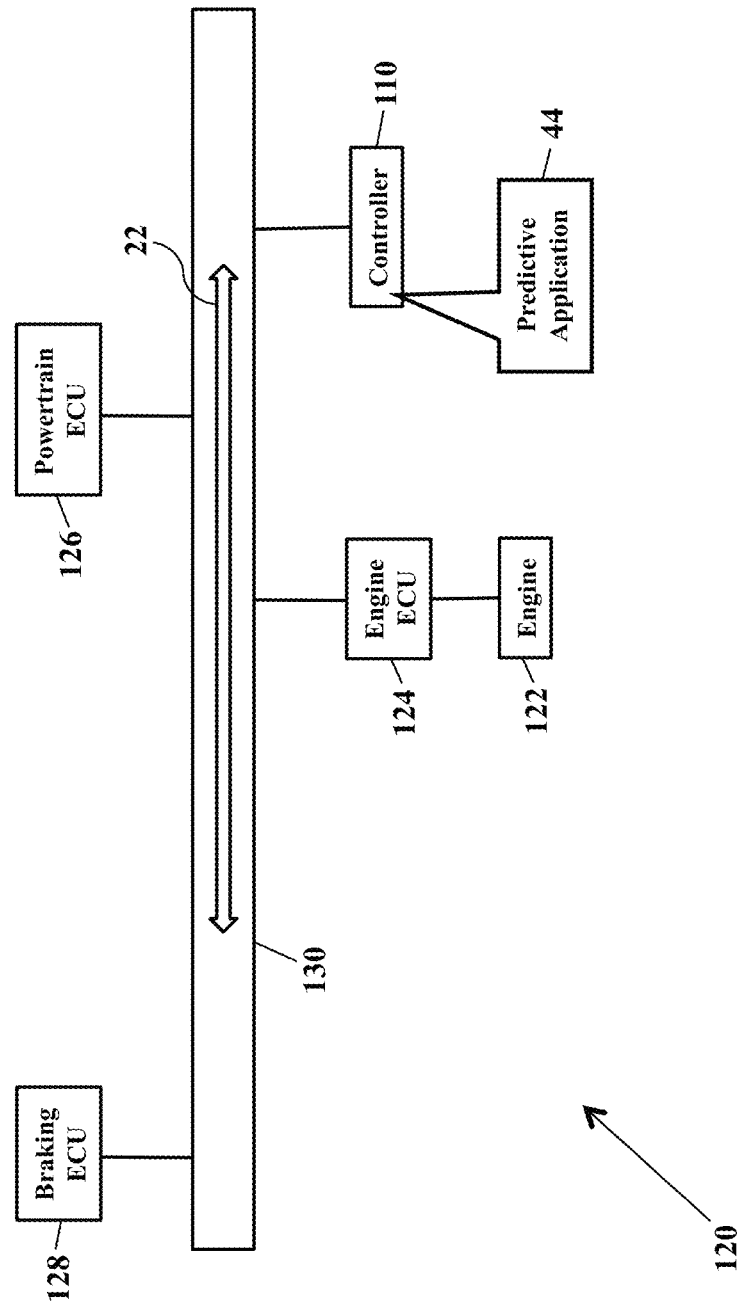

FIG. 15 is a block diagram illustrating a controller area network (or "CAN") 120, according to exemplary embodiments. As the reader may understand, the vehicle 20 may have many electronic systems controlling many components and systems. For example, the engine 122 may have an engine controller 124 (or electronic control unit or "ECU"). The transmission may have a powertrain electronic control unit 126. The braking system may have a brake electronic control unit 128. There may be many more electronic control units throughout the vehicle 20. The controller area network 120 thus allows all the various electronic control units to communicate with each other. A CAN bus 130, for example, allows the various electronic control units to send and receive messages that are addressed to one or more of the electronic control units. The controller 110 may connect to or interface with the CAB bus 130, thus allowing the controller 110 to monitor or read any sensor data 22 sent into or along the CAN bus 130.

Exemplary embodiments thus use data analysis to predict maintenance. Exemplary embodiments may overlay the telematics sensor data 22 with the maintenance data 24, thus allowing correlations between sensor readings, the environmental weather data 26, and actual equipment failures. Statistical models may thus predict failures using machine-learning algorithms. Model-derived rules may guide forward-going decisions on when to perform the maintenance. Preventive maintenance can be wasteful, especially if performed too soon. Reactive maintenance, however, is costly when performed too late. Exemplary embodiments, instead, predict maintenance based on historical vehicle data generated from vehicle activity. Users and maintenance coordinators may thus determine the most effective cost expenditure models to improve customer experience.

Figure 16:
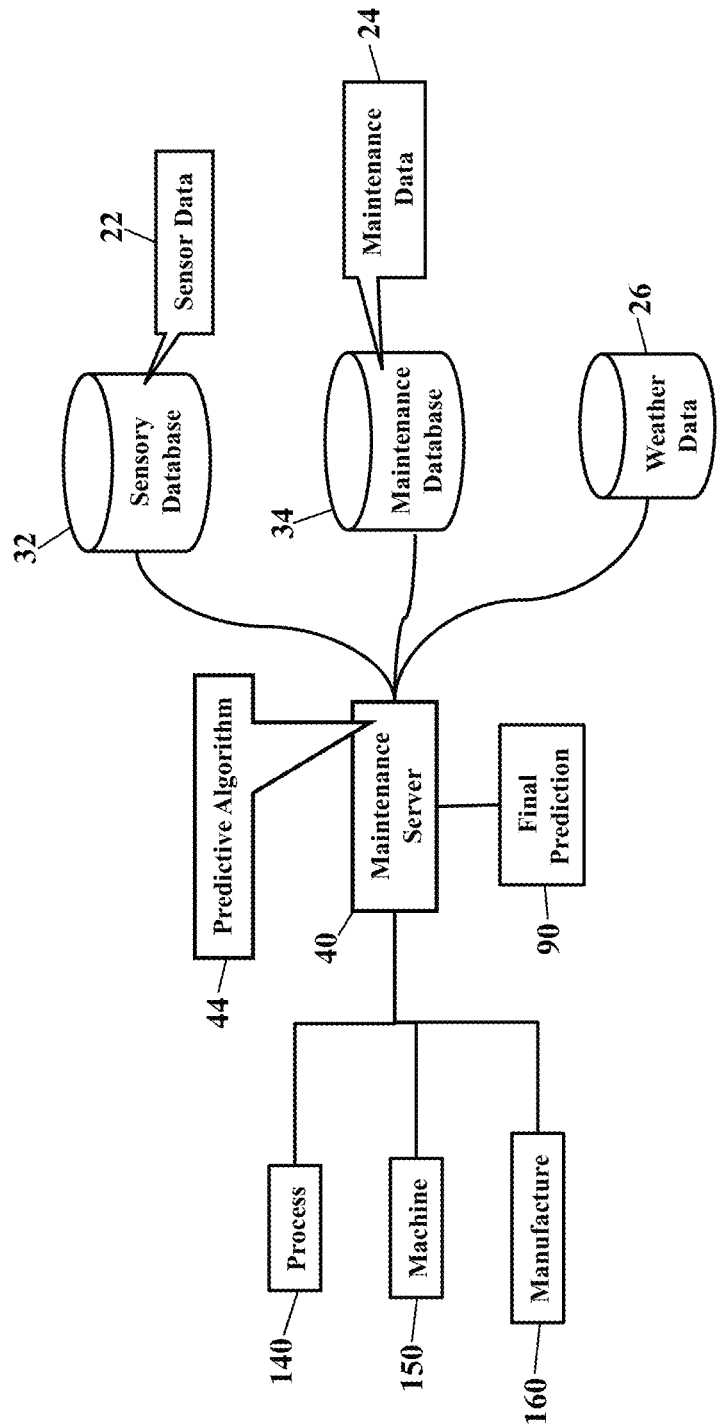
FIGS. 16-18 depict still more operating environments for additional aspects of the exemplary embodiments.

FIG. 16 is a schematic illustrating yet another exemplary operating environment. As this disclosure above mentioned, exemplary embodiments may be applied to any process 140, any machine 150, and any manufacture 160. That is, the maintenance server 40 may obtain the sensor data 22, the maintenance data 24, and the weather data 26 for any use whatsoever. The predictive algorithm 44 may then be executed to make the final prediction 90, as this disclosure explains.

Figure 17:
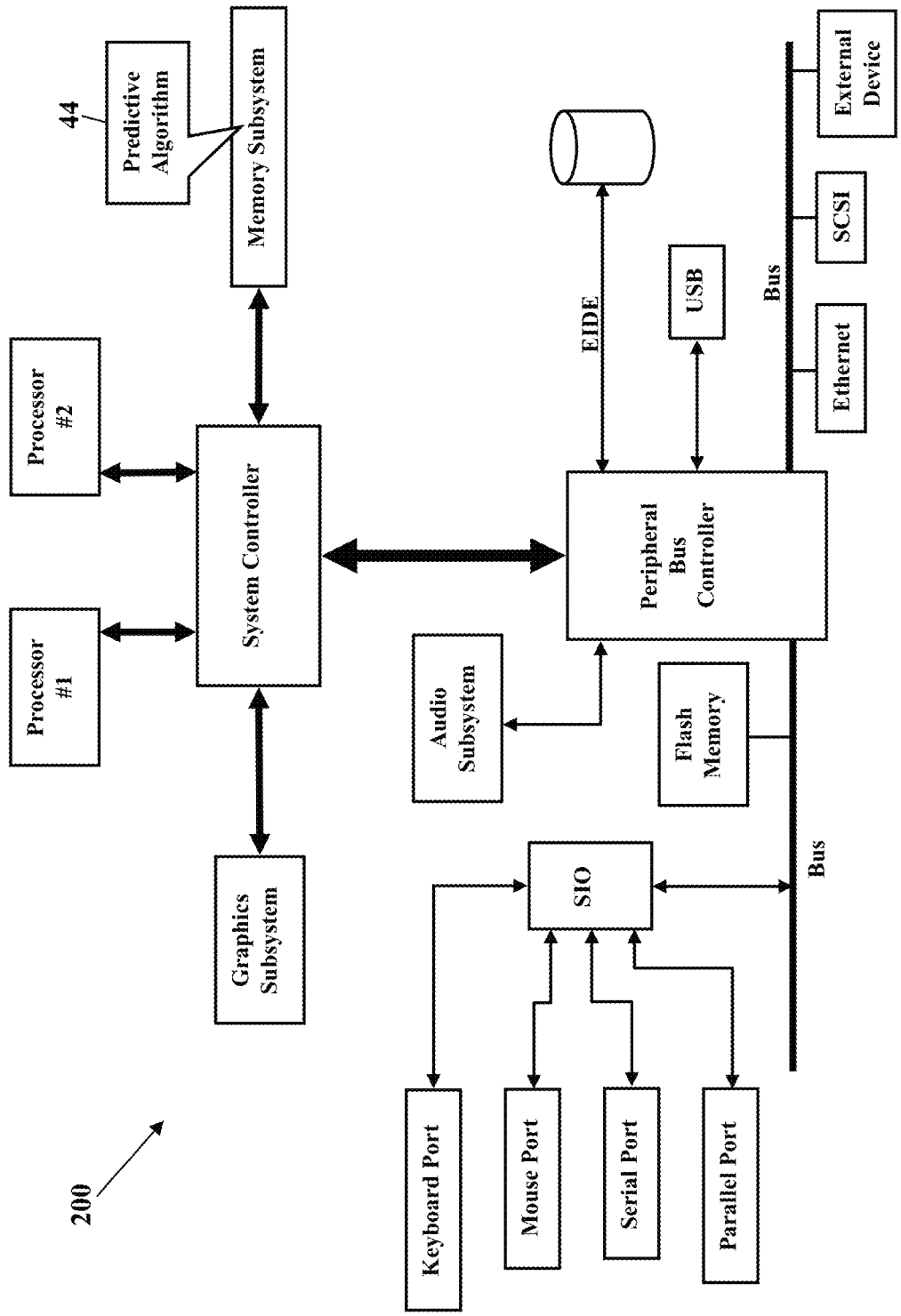

FIG. 17 is a schematic illustrating still more exemplary embodiments. FIG. 17 is a more detailed diagram illustrating a processor-controlled device 200. As earlier paragraphs explained, the predictive algorithm 44 may operate in any processor-controlled device. FIG. 17, then, illustrates the predictive algorithm 44 stored in a memory subsystem of the processor-controlled device 200. One or more processors communicate with the memory subsystem and execute either, some, or all applications. Because the processor-controlled device 200 is well known to those of ordinary skill in the art, no further explanation is needed.

Figure 18:
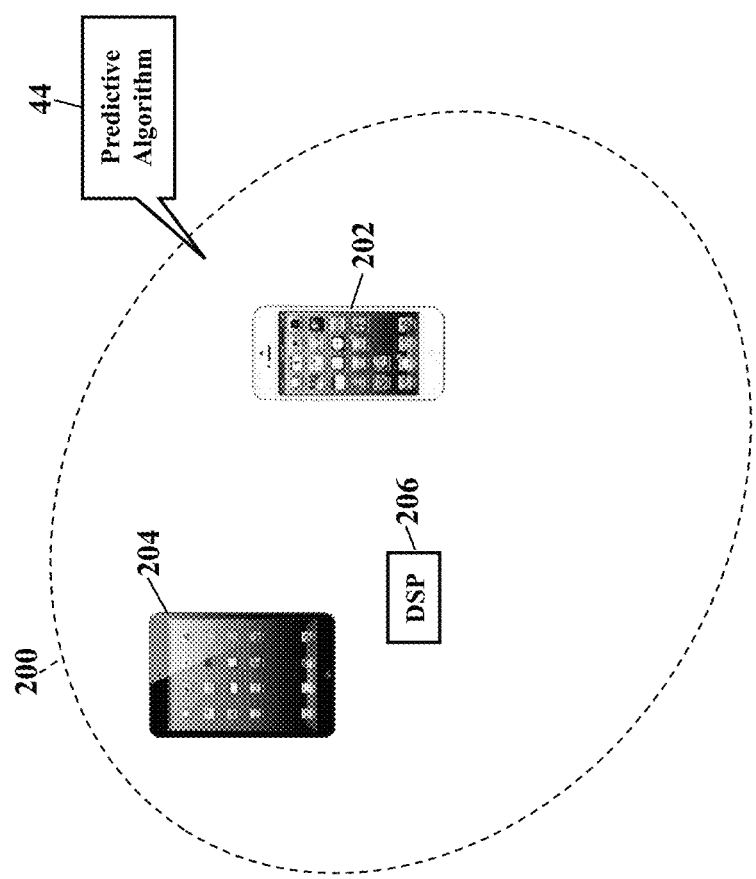

FIG. 18 depicts other possible operating environments for additional aspects of the exemplary embodiments. FIG. 18 illustrates the predictive algorithm 44 operating within various other processor-controlled devices 200. FIG. 18, for example, illustrates that the predictive algorithm 44 may entirely or partially operate within a mobile communications device, such as a smartphone 202 and a tablet computer 204. As processing and memory capabilities increase in mobile communications devices, mobile devices may execute some or all of the predictive algorithm 44. Indeed, any computer system, communications device, or processor-controlled device utilizing a processor and/or a digital signal processor (DP/DSP) 206 may execute some or all of the predictive algorithm 44. The device 200 may also include watches, radios, clocks, printers, gateways, mobile/implantable medical devices, and other apparatuses and systems. Because the architecture and operating principles of the various devices 200 are well known, the hardware and software componentry of the various devices 200 are not further shown and described.

Exemplary embodiments may be applied regardless of networking environment. Exemplary embodiments may be easily adapted to any devices having cellular, WI-FI®, and/or BLUETOOTH® capability. Exemplary embodiments may be applied to devices utilizing any portion of the electromagnetic spectrum and any signaling standard (such as the IEEE 802 family of standards, GSM/CDMA/TDMA or any cellular standard, and/or the ISM band). Exemplary embodiments, however, may be applied to any processor-controlled device operating in the radio-frequency domain and/or the Internet Protocol (IP) domain. Exemplary embodiments may be applied to any processor-controlled device utilizing a distributed computing network, such as the Internet (sometimes alternatively known as the "World Wide Web"), an intranet, the local-area network 100 (LAN), and/or a wide-area network (WAN). Exemplary embodiments may be applied to any processor-controlled device utilizing power line technologies, in which signals are communicated via electrical wiring. Indeed, exemplary embodiments may be applied regardless of physical componentry, physical configuration, or communications standard(s).

Exemplary embodiments may utilize any processing component, configuration, or system. The processor explained herein could be multiple processors, which could include distributed processors or parallel processors in a single machine or multiple machines. The processor can be used in supporting a virtual processing environment. The processor could include a state machine, application specific integrated circuit (ASIC), programmable gate array (PGA) including a Field PGA, or state machine. When any of the processors execute instructions to perform "operations", this could include the processor performing the operations directly and/or facilitating, directing, or cooperating with another device or component to perform the operations.

Exemplary embodiments may be physically embodied on or in a computer-readable storage medium. This computer-readable medium, for example, may include CD-ROM, DVD, tape, cassette, floppy disk, optical disk, memory card, memory drive, and large-capacity disks. This computer-readable medium, or media, could be distributed to end-subscribers, licensees, and assignees. A computer program product comprises processor-executable instructions for predictive maintenance, as the above paragraphs explained.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

The invention claimed is:

1. A method, comprising:
   obtaining, by a vehicle controller comprising a processor, sensor data associated with a vehicle;
   obtaining, by the vehicle controller, maintenance data associated with the vehicle;
   obtaining, by the vehicle controller, weather data associated with the vehicle, wherein the weather data comprises humidity data; and
   generating, by the vehicle controller, using a machine learning model, a prediction for a group of components of the vehicle for maintenance of the vehicle based on the sensor data, the weather data, and the maintenance data.

2. The method of claim 1, wherein the weather data further comprises precipitation data.

3. The method of claim 1, further comprising wirelessly sending, by the vehicle controller, the prediction for the group of components of the vehicle for the maintenance from the vehicle via a communications network to a remote server.

4. The method of claim 1, further comprising generating, by the vehicle controller, a webpage by the vehicle controller, the webpage describing the prediction for the group of components of the vehicle for the maintenance.

5. The method of claim 1, further comprising generating, by the vehicle controller, a graphical user interface for a display of the prediction for the group of components of the vehicle for the maintenance.

6. The method of claim 1, further comprising recommending, by the vehicle controller, a service appointment associated with the prediction for the group of components of the vehicle for the maintenance.

7. The method of claim 1, wherein the machine learning model comprises a random forest algorithm.

8. A system, comprising:
a processor; and
a memory, coupled to the processor, that stores executable instructions, that when executed by the processor, facilitate performance of operations, comprising:
retrieving sensor data associated with a vehicle;
retrieving maintenance data associated with the vehicle;
retrieving weather data associated with the vehicle, wherein the weather data comprises precipitation data; and
generating, using a machine learning model, a prediction for components of the vehicle for maintenance based on the sensor data, the weather data, and the maintenance data.

9. The system of claim 8, wherein the weather data further comprises humidity data.

10. The system of claim 8, wherein the operations further comprise generating a webpage describing the prediction for the components of the vehicle for the maintenance.

11. The system of claim 10, wherein the operations further comprise displaying the webpage describing the prediction in the vehicle.

12. The system of claim 8, wherein the operations further comprise generating a user interface describing the prediction for the components of the vehicle for the maintenance.

13. The system of claim 12, wherein the operations further comprise displaying the user interface describing the prediction in the vehicle.

14. The system of claim 8, wherein the machine learning model comprises employs a random forest algorithm.

15. The system of claim 8, wherein the operations further comprise recommending a service appointment associated with the components of the vehicle for the maintenance.

16. A non-transitory computer-readable medium having instructions stored thereon that, when executed by a processor, facilitate performance of operations, comprising:
retrieving sensor data associated with a vehicle;
retrieving maintenance data associated with the vehicle;
retrieving weather data associated with the vehicle, wherein the weather data comprises precipitation data and humidity data; and
generating, using a machine learning model, a prediction for a components of the vehicle for maintenance based on the sensor data, the weather data, and the maintenance data.

17. The non-transitory computer-readable medium of claim 16, wherein the weather data further comprises outdoor temperature data.

18. The non-transitory computer-readable medium of claim 16, wherein the operations further comprise displaying a user interface, via a display device of the vehicle, the user interface describing the prediction.

19. The non-transitory computer-readable medium of claim 16, wherein the machine learning model comprises a random forest algorithm.

20. The non-transitory computer-readable medium of claim 16, wherein the operations further comprise recommending a service appointment for the components of the vehicle for the maintenance.

* * * * *